(12) United States Patent
Pabst et al.

(10) Patent No.: US 8,753,244 B2
(45) Date of Patent: Jun. 17, 2014

(54) BEARING PIN FOR A PLANETARY TRANSMISSION AND CARRIER ARRANGEMENT FOR A PLANETARY TRANSMISSION

(75) Inventors: Alexander Pabst, Erlangen (DE); Andreas Ziegler, Charlotte, NC (US); Frank Beeck, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 13/450,900

(22) Filed: Apr. 19, 2012

(65) Prior Publication Data

US 2012/0270696 A1 Oct. 25, 2012

(30) Foreign Application Priority Data

Apr. 20, 2011 (DE) .......................... 10 2011 007 801

(51) Int. Cl.
*F16H 57/08* (2006.01)
(52) U.S. Cl.
USPC ........................................................ 475/331
(58) Field of Classification Search
CPC .. F16H 57/08; F16H 57/082; F16H 2057/085

USPC .......................................... 384/456, 462, 474
See application file for complete search history.

(56) References Cited

U.S. PATENT DOCUMENTS

| 5,102,379 A * | 4/1992 | Pagluica et al. ................. 475/331 |
| 2009/0105033 A1* | 4/2009 | Woo ................................ 475/331 |
| 2011/0111917 A1* | 5/2011 | Heitzenrater et al. ........ 475/331 |

FOREIGN PATENT DOCUMENTS

| DE | 10 2006 049 998 A1 | 4/2008 |
| DE | 10 2007 017 138 A1 | 10/2008 |

* cited by examiner

*Primary Examiner* — Edwin A Young
(74) *Attorney, Agent, or Firm* — Simpson & Simpson, PLLC

(57) ABSTRACT

A bearing pin for a planetary transmission, which has a cylindrical base body with a radial bore formed in one axial end of the base body. A locking element is mounted with a salient radial portion in the radial bore and serves as an anti-rotation feature of the base body. The bearing pin creates a possibility of reliable fixing of a bearing pin in a planetary transmission with a low-complexity manufacturing procedure. Also, a carrier arrangement for a planetary transmission, which includes such a bearing pin is disclosed.

9 Claims, 2 Drawing Sheets

BEARING PIN FOR A PLANETARY TRANSMISSION AND CARRIER ARRANGEMENT FOR A PLANETARY TRANSMISSION

CROSS-REFERENCE TO RELATED APPLICATION

This application claims the priority of DE 10 2011 007 801.0 filed Apr. 20, 2011, which is incorporated by reference herein.

FIELD OF THE INVENTION

The invention relates to a bearing pin for a planetary transmission, which has a cylindrical base body, and the base body has a radial bore on one axial end.

The invention further relates to a carrier arrangement for a planetary transmission, which includes the bearing pin.

BACKGROUND OF THE INVENTION

Planetary transmissions are known transmission types for use in automotive vehicles. Due to their compact construction they enable a high performance density compared to other types of transmissions, a high torque transmission in a minimal design space as well as a variation of the translation ratio under load (i.e., without an interruption of force flow). At the same time, they also meet the requirements of a smallest possible structural and transmission weight.

The simplest form of a planetary transmission, a so-called one-step planetary transmission, basically comprises a sun gear, a number of planet gearwheels, and a planet gearwheel carrier as well as an annulus. The sun gear is in positive engagement with the internal-geared annulus through one or through each of the planet gearwheels used. Through the internal gearing of the annulus, these gearwheels can be arranged in a compact, space-saving arrangement. Depending on the required multiplication or reduction ratio, the planetary transmission can be configured with one or more planetary steps.

Basically, either the sun gear or the planet gearwheel carrier or the annulus can be driving, driven, or fixed members. In the ease of a sun gear driven by a driving shaft, the sun gear transmits, for instance, the torque through the annulus to the planet gearwheels mounted in the planet gearwheel carrier. Through the connection of the planet gearwheel carrier to a driven shaft, it becomes possible to achieve a multiplication or reduction of the transmission as a function of the number of teeth comprised in the respective gearwheel.

As a rule, the planet gearwheels are mounted on the planet carrier through bearing pins. The bearing pins thus function as rolling bearing raceways for the planet gearwheels.

For this reason, it is particularly important for the bearing pins to be mounted secure against rotation on the planet carrier or on an appropriate carrier element of a carrier arrangement in order to be able to guarantee a correspondingly disturbance-free functioning of the planetary transmission through the reliable positioning of the planet gearwheels. Normally, for this purpose, the bearing pins are staked on the planet carrier or on the carrier element so that a rotation and/or displacement of the bearing pin is prevented.

DE 10 2006 049 998 A1 discloses a planet gearwheel pin that is arranged in a carrier element of a planet gearwheel carrier configured as a guide disc. The planet gearwheel pin is connected to the guide disc by staking and comprises accordingly on its front end, at least one depression into which the material of the guide disc is staked.

A further arrangement of a planet pin in a planet carrier is disclosed in DE 10 2007 017 138 A1. The planet carrier comprises two so-called web metal sheets comprising reception apertures. Planet pins can be inserted into and secured in axial direction within these reception apertures. The axial securing in this case is likewise realized through a front-end staking of the planet pin to one of the two web metal sheets.

It is indeed possible to achieve a secure fixing of the bearing pin on the planet carrier by staking the bearing pin according to one of the two cited examples. However, this manner of fixing necessitates a more complex manufacturing method accompanied by a high cost factor.

SUMMARY OF THE INVENTION

It is therefore a first object of the invention to provide a better method of fixing a bearing pin in a planetary transmission than the prior art, this method involving less manufacturing, costs and complexity than the prior art.

A second object of the invention is to provide a carrier arrangement comprising a bearing pin of the aforesaid type.

According to the invention, the first object is achieved by a bearing pin for a planetary transmission, which comprises a cylindrical base body that comprises a radial bore on one axial end, and a locking element, which is mounted with a salient radial portion in the radial bore that serves as an anti-rotation feature of the base body.

The invention takes into account that the hitherto used method of mechanical staking of a bearing pin on the carrier element or on a planet carrier compulsorily requires that the bearing pins to be staked be made, at least on their axial end provided for their fixing, out of an adequately soft material so that the plastic deformation required for staking is possible. In contrast, the remaining part of the bearing pin must possess adequate mechanical strength so that it can fulfill its function as a roiling bearing raceway and withstand the temperatures and forces prevailing during the operation of a planetary gear.

Considering these different requirements on the bearing pin, it has been hitherto impossible to achieve an effective production with a completely hardened base body, in addition, the plastic deformation occurring during staking leads to inexactitudes in the shape and position of the bearing pin during its fixing on a carrier element within the planetary transmission.

Taking all the aforesaid drawbacks into consideration, the invention recognizes that these problems can be solved by using a bearing pin that comprises a locking element for anti-rotational fixing of the base body and this locking element is mounted with a salient radial portion in a radial bore of the base body.

The salient radial portion of the locking element (i.e., the overhang that extends outside of the base body of the bearing pin radially outwards) creates, in the installed state in a planetary transmission, an anti-rotation feature of the bearing pin. For this purpose, during installation in a planetary transmission and fixing on a carrier element, the overhang can engage, for example, into apertures or recesses and thus prevent rotation.

At the same time, the salient radial portion creates a one-sided axial securing so that the bearing pin can no longer be displaced in axial direction at the point at which the salient radial portion of the locking element is arranged on a carrier element.

Because the locking element renders a staking for fixing on a carrier element superfluous, the base body of the bearing pin can be uniformly hardened over its entire axial length during its production. On the whole, therefore, the locking element, or its salient radial portion, makes it possible to do without a complex and cost-intensive production of the bearing pin and also to omit a subsequent corresponding fixing.

The locking element itself can be configured, for example, out of a solid material or with a hollow-cylindrical shape. For example, if the locking element has a solid configuration, it can be a needle or a cone. Suitable for use as hollow cylinders are, for instance, so-called dowel pins or dowel bushings configured as slit pins. These are made of a sheet metal strip shaped into a tube that is not completely closed on its periphery. In this case, the diameter is chosen such that, in the installed state, it can be compressed to a desired size.

Alternatively, it is also possible, for example to use so-called grooved drive studs that can be driven home for fixing in the radial bore. A standard grooved drive stud basically possesses three bead notches on its periphery that get deformed when the grooved drive stud is driven into the radial bore.

As an alternative to the aforesaid method of fixing the locking element, this can, for example, also be pressed or merely inserted into the radial bore. Depending on the type of arrangement, the radial bore and the inserted locking element can be appropriately matched to each other in diameter and structure.

The salient radial portion of the locking element can basically project with different lengths radially out of the base body of the bearing pin, which means that the length of the salient radial portion is variable and depends on the ratio between the diameter of the base body and the length of the locking element. Matching is performed preferably taking into consideration the installed state and the configuration of a planetary carrier or carrier element on which fixing is to be realized.

The bearing pin itself can be differently configured taking into account the dimension of the planetary transmission. The axial length of the bearing pin, for example, must be matched to the axial width of a planet gearwheel to be mounted. The diameter of the bearing pin is likewise matched to the planet gearwheel to be mounted and to the bearing used for mounting. The number of bearing pins used also depends on the configuration of the planetary transmission. As a rule, one planet gearwheel is mounted on one bearing pin so that both components are advantageously equal in number.

The bearing pin as also the locking element can basically both be made out of solid material so that the radial bore on one axial end extends radially completely through the entire base body. Alternatively, the bearing pin may also have a hollow cylindrical configuration in which case, the radial bore extends only in the outer shell of the bearing pin.

In a further advantageous embodiment of the invention, a rolling element is used as a locking element. Particularly suitable in this case are needle rollers or cylindrical rollers. These can be taken, for instance, out of an overproduction and be inserted into the radial bore directly by the manufacturer of the bearing pin. In this way costs and assembly work etc. for the customer can be accordingly reduced.

In a further advantageous embodiment, a dowel pin is used as a locking element. Dowel pins are suitable particularly by reason of their simple and economic manufacturing. Moreover, if dowel pins are used as locking elements no high demands are made of the installation conditions so that, for example, a fit for the radial bore is not required and a complex and expensive finishing can be dispensed with in this case too.

Preferably, the base body is configured as a hollow cylinder and comprises a number of oil bores. In the case of a hollow cylindrical configuration, a cavity can be arranged opposite the radial bore on the inner peripheral surface of the outer shell of the base body. A locking element that is only inserted into the radial bore can engage into this cavity with one end so that, for instance, tilting can be prevented.

In the installed state of a bearing pin, oil can be supplied through the oil bores to the mounting point of a planet gearwheel mounted on the bearing pin. The number and the diameter of the oil bores can vary depending on the configuration of the bearing pin. In the case of a hollow cylindrical configuration, the oil bores start preferably from the inner periphery of the outer shell and extend radially outwards in the outer shell.

Basically, a bearing pin made out of solid material can also be configured with a number of oil bores which serve for lubricating the bearing. For this purpose, preferably, longitudinal bores are arranged in the bearing pin to communicate with oil bores extending radially outwards to the outer periphery. Through this connection, oil is transported from the longitudinal bores into the radial bores and from these to the outer periphery.

Appropriately, the base body is made of a metallic material, particularly also metal alloys which meet the requirements for use in a planetary transmission. Basically, metallic materials are suitable for this use particularly by reason of their temperature and corrosion resistance under the high loads occurring during the operation of a planetary transmission. Moreover, they also possess the necessary strength for use as roiling bearing raceways. A particularly suitable material is, for instance, the chromium steel 100Cr6 which meets the necessary requirements.

The second object of the invention is achieved through a carrier arrangement for a planetary transmission, which comprises a carrier element with a recess, and a bearing pin which has a cylindrical base body with a radial bore formed in one axial end of the base body and a locking element, which has a salient radial portion and serves as an anti-rotation feature of the base body, mounted in the radial bore. The bearing pin is arranged in the recess of the carrier element and the locking element is supported through its salient radial portion on the carrier element.

Through the support of the salient radial portion of the locking element, together with the arrangement of the bearing pin in the recess of the carrier element, the required anti-rotation feature is created. Additionally, an axial securing acting in one direction is also realized. On the whole, a carrier arrangement with the aforesaid configuration for use in a planetary transmission offers an economical fixing method of a bearing pin in a planetary transmission with a less complex manufacturing procedure. A staking and, thus also, a complex and expensive production of the bearing pin are rendered superfluous.

The carrier arrangement fundamentally serves for mounting one or more planet gearwheels within a planetary transmission. The bearing pins required for this purpose are arranged on a carrier element. The carrier element thus preferably constitutes the base body of the carrier arrangement.

At least one recess is provided for fixing a bearing pin in the carrier arrangement. Appropriately, the diameter of the recess is matched to the outer diameter of the base body of the bearing pin. In other words, the inner diameter must be slightly larger or at least substantially equal to the outer diameter of the base body so that the bearing pin can be inserted or pushed into the recess in a simple manner.

It goes without saying that even a plurality of bearing pins can be fixed on the carrier element. Accordingly, a plurality of recesses is configured in the carrier element and the preceding description applies in an analogous manner.

In one embodiment of the invention, the carrier element comprises a groove into which the salient radial portion of the locking element engages. In this way, an undesired twisting of the bearing pin is prevented because the salient radial portion in the groove is enclosed laterally by the material of the carrier element. In addition, the salient radial portion (i.e., the end of the locking element extending outwards in radial direction from the base body) is also stopped in axial direction by the carrier element so that a one-sided axial securing of the bearing pin is achieved, in other words, the groove, or the engagement of the salient radial portion of the locking element into the groove, creates the required anti-rotational and axial securing of the bearing pin within the planetary transmission.

A further advantageous embodiment of the invention comprises at least one planet gearwheel that is mounted on the bearing pin. The diameter and the number of teeth of the planet gearwheel can be matched to the demands on the planetary transmission and the multiplication and reduction ratios required.

Mounting can be affected, for instance, through a sliding bearing or even through a rolling bearing. In the case of a sliding bearing-mounting, the two parts that move relative to each other are in direct contact. They slide on each other in opposition to the resistance caused by sliding friction, but this can be kept at a low level, for example, through the choice of a low-friction material pairing or through the production of a lubricant film between the contact surfaces. In the present case, the lubricant film can be guaranteed by the oil that is transported through the oil bores in the base body of the bearing pin to its outer periphery.

Suitable for use as rolling bearings (i.e., as bearings equipped with roiling elements) are planet gearwheel bearings that are arranged on the outer periphery of the bearing pin. The outer periphery of the bearing pin serves in this case as a rolling bearing raceway for the bearing. Preferably used are crank pin cages with guided needle crown rings. Such bearings require a smaller radial height and are accompanied by particularly low friction. The small radial height contributes, for example, to meeting the economically relevant requirement of a design space reduction.

An additional axial securing device can also be arranged on one axial end of the bearing pin. Through this measure, the bearing pin is axially secured against displacement even in the axial direction in which it is not axially secured through the salient radial portion of the locking element, so that a reliable and safe mounting of the planet gearwheel is guaranteed.

Moreover, the carrier element can be made of a metallic material. As already set forth in the description of the base body of the bearing pin, metallic materials particularly fulfill the requirements for use in a planetary transmission because they withstand high loads during operation, for example, by reason of their temperature and corrosion resistance and they also possess the required mechanical strength.

Further advantageous developments are to be found in the dependent claims which are directed to the bearing pin but which can be applied analogously to the carrier arrangement.

BRIEF DESCRIPTION OF THE DRAWING

The invention will be described more closely below with reference to an appended drawing.

DETAILED DESCRIPTION OF THE INVENTION

Figure 1:
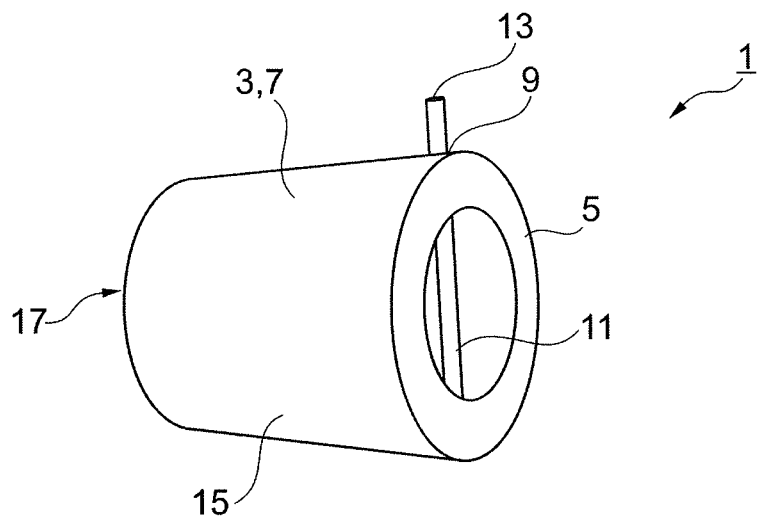
FIG. 1 shows a bearing pin for a planetary transmission in a three-dimensional representation.

FIG. 1 shows a bearing pin 1 for a planetary transmission in a three-dimensional representation. The bearing pin 1 comprises a cylindrical base body 3 and a radial bore 9 arranged on one axial end 5 of the base body 3 in its outer shell 7.

The base body 3 is made as a hollow cylinder out of a steel of Type 100Cr6 that possesses the necessary strength and temperature resistance for use in a planetary transmission. The base body 3 is completely hardened because a fixing by staking on a carrier element, not shown, can be dispensed with.

For this purpose, a locking element 11 configured as a needle is inserted into the radial bore 9 of the base body 3. The locking element 11 is mounted with a salient radial portion 13 in the radial bore 9. In the installed state in a planetary transmission, the salient radial portion 13 creates, on the one hand, an anti-rotation feature of the bearing pin 1. On the other hand, the salient radial portion 13 of the locking element 11 permits a one-sided axial securing.

Figure 3:
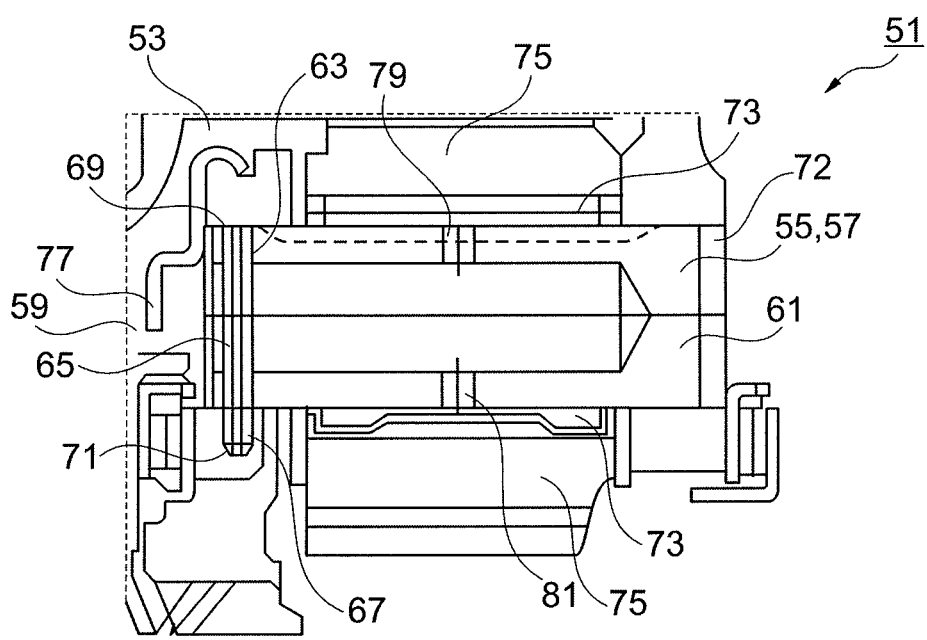
FIG. 3 shows a longitudinal section of a carrier arrangement for a planetary transmission comprising a carrier element and a bearing pin.

For an elucidation of the installed situation of a bearing pin 1, reference can be made to the detailed description of FIG. 3.

The bearing pin 1 is further configured with a number of oil bores 15, only one of which is shown in the figure. In the installed state of the bearing pin 1, oil for supply to a planet gearwheel mounted on the bearing pin 1 can be made available through the oil bore 15. The axial end 17 that is not intended for fixing on a carrier element is closed through a disk-shaped bottom so that oil cannot flow out of the bearing pin at this point.

Figure 2:
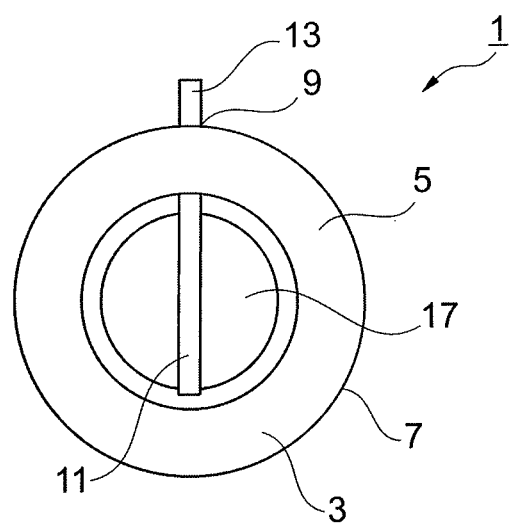
FIG. 2 shows the bearing pin of FIG. 1 in a cross-sectional view.

The bearing pin 1 of FIG. 1 is shown in a cross-sectional view in FIG. 2. This figure clearly shows the arrangement of the locking element 11 in the radial bore 9 as well as the salient radial portion 13 which projects beyond the base body 3 of the bearing pin 1 and serves as an anti-rotation device and an axial securing device of the bearing pin in the installed state.

The base body 3 of the bearing pin 1 is made in one piece out of steel. Because a staking for fixing on a carrier element is rendered superfluous through the locking element 11, the base body is uniformly hardened over its entire axial length.

For a further description of the individual components shown in FIG. 2, reference can be made to the detailed description of FIG. 1.

FIG. 3 shows a longitudinal sectional view of a carrier arrangement 51 for a planetary transmission comprising a carrier element 53 and a bearing pin 55. The bearing pin 55 is made out of a metal and comprises a hollow cylindrical base body 57.

One axial end 59 of the base body 57 comprises in its outer shell 61, a radial bore 63. A locking element 65 configured as a dowel pin is mounted in the radial bore 63. The locking element 65 likewise comprises a salient radial portion 67. Through the provision of the locking element 65, it becomes possible to dispense with a staking for fixing on the carrier element 53 so that the base body 57 of the bearing pin 55 is completely hardened.

For an anti-rotational positioning of the bearing pin 55 on the carrier element 53, the carrier element 53 comprises a recess 69 in which the bearing pin 55 is arranged with its axial end 59. In addition, the salient radial portion 67 of the locking element 65 is supported in a groove 71 that communicates with the recess 69. Within the groove 71, the salient radial portion 67 is laterally enclosed by the material of the carrier element 53 and is also additionally limited in one axial direction by the carrier element 53. In this way, both an axial securing as well as an anti-rotation feature of the bearing pin 55 are created.

Both the axial securing and the anti-rotation feature are important for the reliable mounting of the planet gearwheel 75. This is mounted on the outer periphery of the bearing pin 55 through a bearing 73. This mounting is realized in the present case through a crank pin cage with a guided needle crown ring.

For a reliable fixing of the bearing 73 and, thus, for a secure positioning of the planet gearwheel 75, an axial securing device 77 is additionally arranged on the axial end 59 of the bearing pin 55 and prevents a slipping of the bearing pin 55.

Further, the outer peripheral surface of the bearing pin 55 constitutes the rolling bearing raceway for the needle crown ring that is guided in the crank pin cage. The lubrication of the bearing 73 is achieved through the oil bores 79, 81 through which oil is pressed from the inner periphery of the bearing pin 55 to its outer periphery.

LIST OF REFERENCE NUMERALS

1 Bearing Pin
3 Base Body
5 Axial End
7 Outer Shell
9 Radial Bore
11 Locking Element
13 Salient Radial Portion
15 Oil Bore
17 Axial End
51 Carrier Arrangement
53 Carrier Element
55 Bearing Pin
57 Base Body
59 Axial End
61 Outer Shell
63 Radial Bore
65 Locking Element
67 Salient Radial Portion
69 Recess
71 Groove
72 Axial End
73 Bearing
75 Planet Gearwheel
77 Axial Securing Device
79 Oil Bore
81 Oil Bore

What is claimed:

1. A bearing pin for a planetary transmission, comprising:
    a cylindrical base body having a hollow cylindrical configuration with a first open axial end and a second closed axis end, wherein a radial bore is formed proximate the first axial end of the base body and extends through an entire diameter of the base body; and
    a locking element extending through the entire radial bore and having a salient radial portion that extends radially external to the base body and serves as an anti-rotation feature of the base body.

2. The bearing pin according to claim 1, wherein the locking element is a rolling element.

3. The bearing pin according to claim 1, wherein the locking element is a dowel pin.

4. The bearing pin according to claim 1, wherein the base body has a plurality of oil bores.

5. The bearing pin according to claim 1, wherein the base body is made of a metallic material.

6. A carrier arrangement for a planetary transmission, comprising:
    a carrier element having a recess; and
    a bearing pin having a cylindrical base body with a radial bore formed in one axial end of the base body and a locking element, which has a salient radial portion mounted in the radial bore and serves as an anti-rotation feature of the base body, the bearing pin being arranged in the recess of the carrier element, and the locking element of the bearing pin being supported on the carrier element by the salient radial portion, wherein the carrier element has a groove into which the salient radial portion of the locking element is axially insertable.

7. The carrier arrangement according to claim 6, further comprising at least one planet gearwheel mounted on the bearing pin.

8. The carrier arrangement according to claim 6, further comprising an axial securing device arranged on one axial end of the bearing pin.

9. The carrier arrangement according to claim 6, wherein the carrier element is made of a metallic material.

* * * * *